United States Patent
Shirai

(10) Patent No.: US 9,565,376 B2
(45) Date of Patent: Feb. 7, 2017

(54) IMAGE PROCESSING APPARATUS, IMAGE PROCESSING METHOD, AND STORAGE MEDIUM FOR AT LEAST ONE OF CORRECTING AND REDUCING AT LEAST ONE COMPONENT OF A COLOR BLUR OF AN IMAGE

(71) Applicant: CANON KABUSHIKI KAISHA, Tokyo (JP)

(72) Inventor: Kunihiro Shirai, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 14/614,249

(22) Filed: Feb. 4, 2015

(65) Prior Publication Data

US 2015/0222826 A1  Aug. 6, 2015

(30) Foreign Application Priority Data

Feb. 6, 2014  (JP) ................................ 2014-021609

(51) Int. Cl.
- *H04N 9/64* (2006.01)
- *H04N 5/357* (2011.01)
- *H04N 9/07* (2006.01)
- *H04N 9/04* (2006.01)

(52) U.S. Cl.
CPC ............ *H04N 5/357* (2013.01); *H04N 5/3572* (2013.01); *H04N 9/045* (2013.01); *H04N 9/07* (2013.01)

(58) Field of Classification Search
CPC ........ H04N 9/07; H04N 5/357; H04N 5/2351; H04N 5/243; H04N 9/045; H04N 9/68; H04N 9/646;G06T 5/20; G06T 5/003; G06T 2207/10024; G06T 2207/20056

See application file for complete search history.

(56) References Cited

U.S. PATENT DOCUMENTS

| 2010/0079615 A1* | 4/2010 | Hatakeyama | ............. G06T 5/20 348/223.1 |
| 2011/0135216 A1* | 6/2011 | Hatakeyama | ........... G06T 5/003 382/260 |

FOREIGN PATENT DOCUMENTS

| JP | 2007-133591 A | 5/2007 |
| JP | 2010-86138 A | 4/2010 |
| JP | 2012-129932 A | 7/2012 |

* cited by examiner

*Primary Examiner* — Twyler Haskins
*Assistant Examiner* — Carramah J Quiett
(74) *Attorney, Agent, or Firm* — Canon USA, Inc. I.P. Division

(57) ABSTRACT

At least one image processing apparatus is provided for preventing inadequate correction of, and to properly correct, a blur component in an image from occurring. The at least one image processing apparatus generates an image recovery filter for correcting chromatic aberration from an optical transmission function (OTF), and corrects the chromatic aberration of a captured image using the image recovery filter. Further, the at least one image processing apparatus calculates characteristics of a color blur of each area in a case where the image recovery filter has been used. Furthermore, the at least one image processing apparatus detects the remaining color blur in an edge of the image on which the chromatic aberration has been corrected using the image recovery filter from a result of calculating the characteristics of the color blur, and removes the color blur.

28 Claims, 14 Drawing Sheets

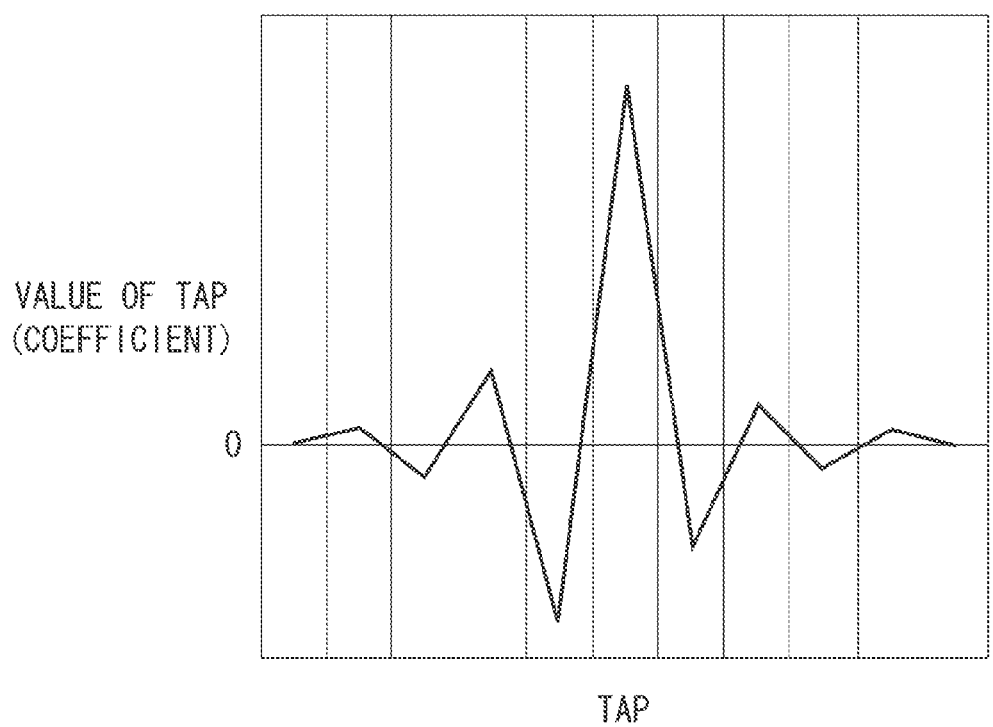

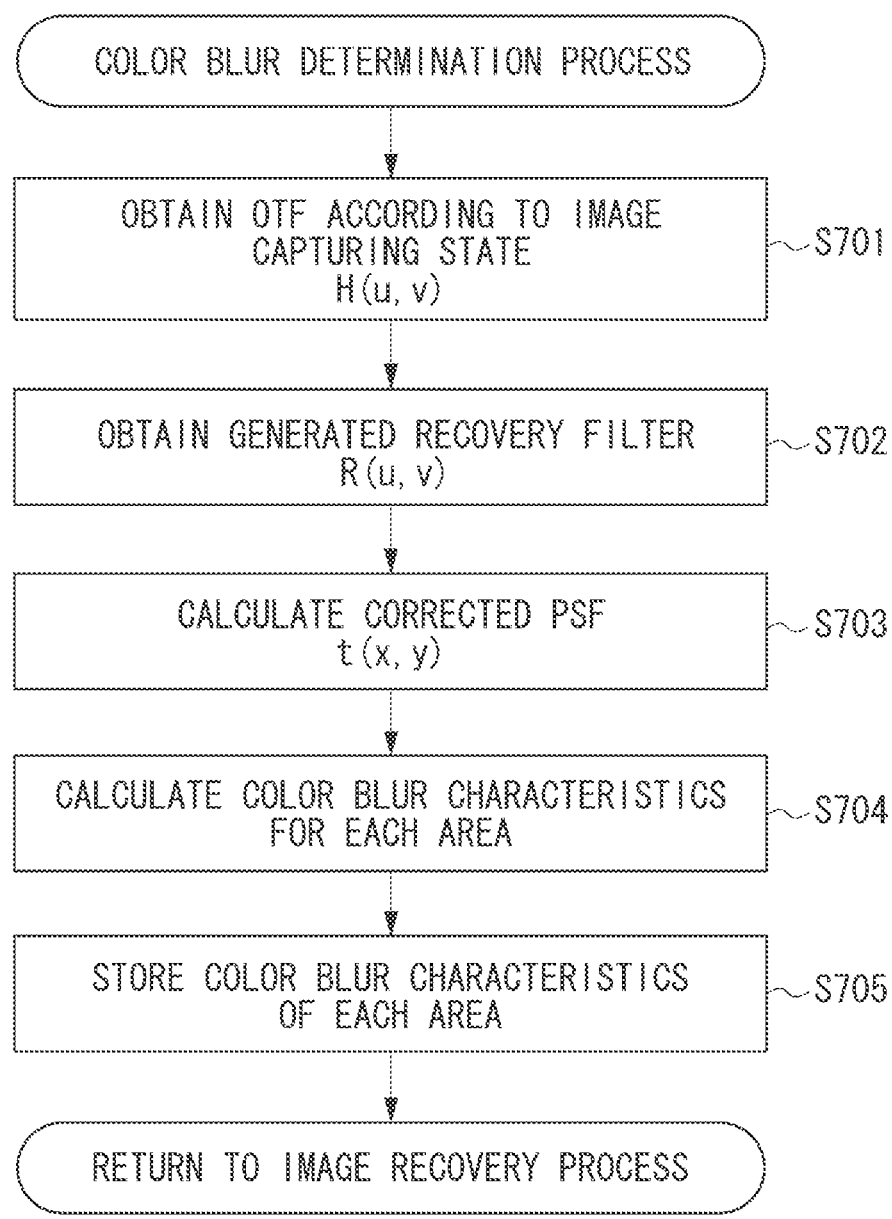

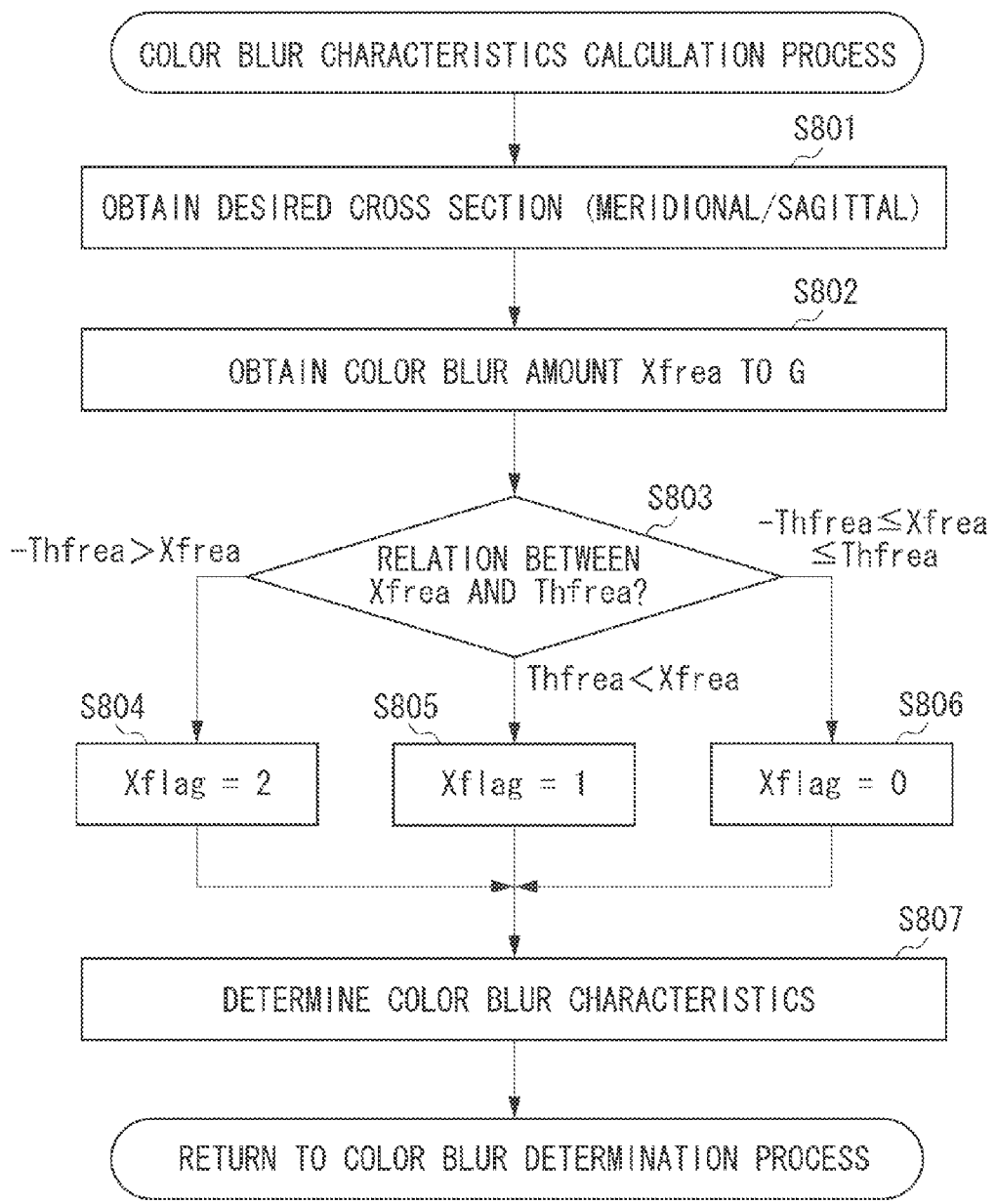

| AREA | BLURRED COLOR | DIRECTION | BLURRED AMOUNT(pix) |
|---|---|---|---|
| (0, 0) | NONE | – | – |
| (0, 1) | NONE | – | – |
| ⋮ | | | |
| (0, 5) | BLUE | MERIDIONAL | 2 |
| ⋮ | | | |
| (7, 6) | BLUE | MERIDIONAL | 3 |

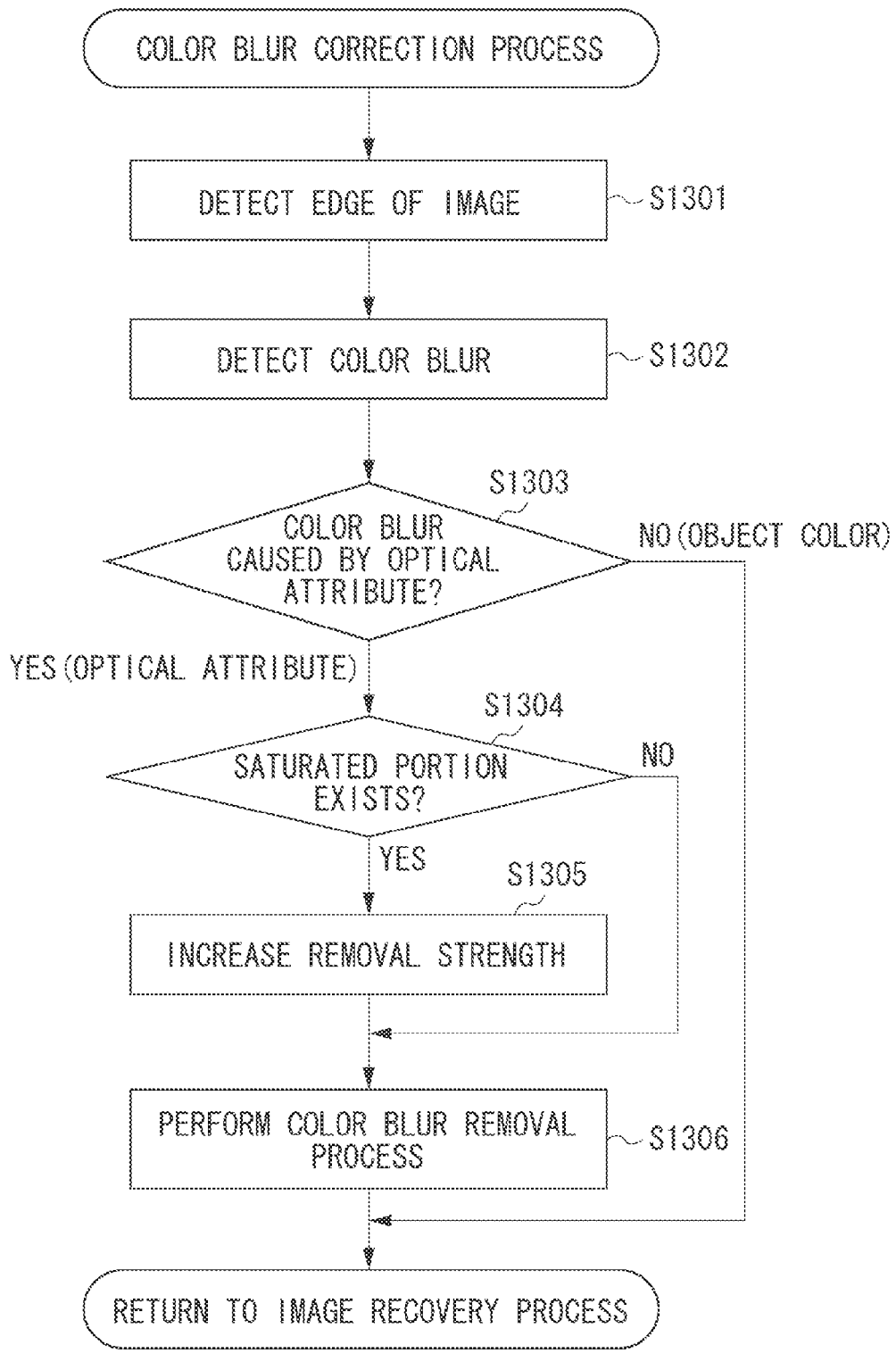

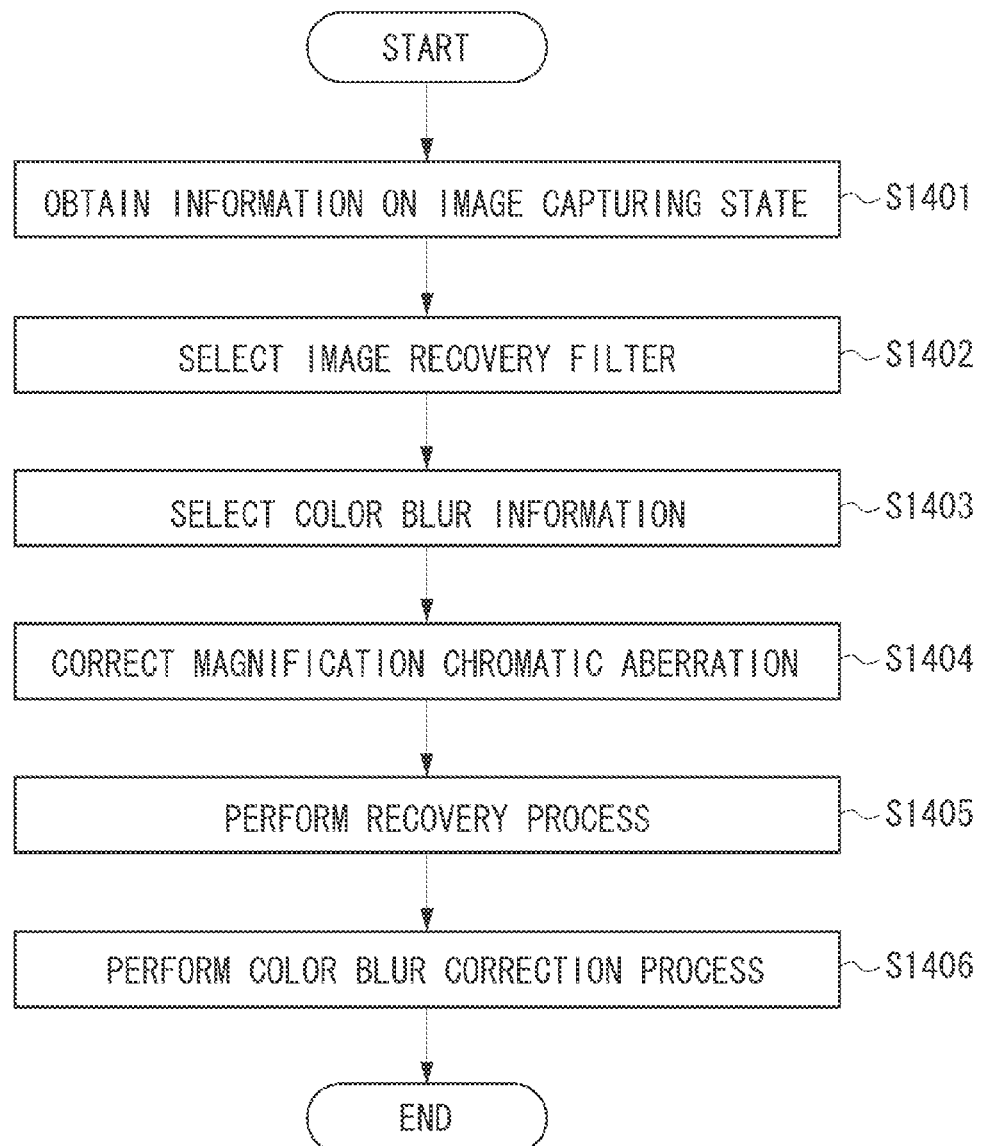

IMAGE PROCESSING APPARATUS, IMAGE PROCESSING METHOD, AND STORAGE MEDIUM FOR AT LEAST ONE OF CORRECTING AND REDUCING AT LEAST ONE COMPONENT OF A COLOR BLUR OF AN IMAGE

BACKGROUND OF THE INVENTION

Field of the Invention

The present inventions relate to at least one image processing apparatus, at least one image processing method, and at least one storage medium. In particular, the present inventions are suitable for use in correcting an image signal.

Description of the Related Art

As digitization of information, an image is handled as signal values, and there are therefore various processes for correcting a captured image. Quality of the image obtained by capturing an object using a digital camera often becomes degraded particularly due to aberration of an imaging optical system.

A blur component is generated in the image due to spherical aberration, comatic aberration, image plane curvature, astigmatism, and the like occurring in the imaging optical system. The blur component of the image due to such types of aberration indicates the one in which a light flux output from a point of the object which in theory converges at a point when there is no aberration and effect of diffraction becomes spread and forms the image. Such a phenomenon optically referred to as a point spread function (PSF) will be hereinafter referred to as the blur component in the image. For example, a defocused image is blurred. However, the blur due to the effect of the aberration in the imaging optical system as described above even when the image is in focus will be referred to as the blur component. Further, a color blur in a color image due to axial chromatic aberration, the chromatic spherical aberration, and chromatic comatic aberration may be described as differences in blurring for each wavelength of light.

There is a method for correcting the degradation of the image due to the blur component using the information on an optical transfer function (OTF) of the imaging optical system. Such a method is referred to as image recovery or image restoration. Hereinafter, the process for correcting the image degradation using the information on the OTF of the imaging optical system will be referred to as an image recovery process.

The image recovery process will be described below. When the degraded image is g (x, y), the original image is f (x, y), the PSF which is a Fourier pair of the OTF is h (x, y), the established equation (1) is as follows:

$$g(x,y)=h(x,y)*f(x,y) \quad (1)$$

where * is convolution, and a coordinate (x, y) is a coordinate on the image.

When the equation (1) is transformed by Fourier transformation to a display format in a frequency surface, a product for each frequency is obtained as indicated by the following equation (2):

$$G(u,v)=H(u,v) \cdot F(u,v) \quad (2)$$

where H is obtained by Fourier transformation on the PSF and is thus the OTF. A coordinate (u, v) is a coordinate in a two-dimensional frequency plane, i.e., the frequency.

The original image is obtained from the image of which the quality has been degraded due to imaging by dividing both sides of the equation (2) by H as in the following equation (3):

$$G(u,v)/H(u,v)=F(u,v) \quad (3).$$

F (u, v) is returned to a real plane by inverse Fourier transformation to obtain the original image f (x, y) as a recovered image.

When the result of the inverse Fourier transformation on $H^{-1}$ is R, the original image can be similarly obtained by performing convolution processing on the image in the real plane as in the following equation (4):

$$g(x,y)*R(x,y)=f(x,y) \quad (4).$$

R (x, y) described above will be referred to as an image recovery filter. Since an actual image includes a noise component, if the image recovery filter generated using a complete inverse of the OTF as described above is employed, the following occurs. The noise component is amplified along with the image of degraded image quality, so that a desired image is not generally obtained. To solve such a problem, there is a method, for example a method using a Weiner filter, for suppressing a recovery rate in a high frequency side of the image according to an intensity ratio between an image signal and a noise signal. The degradation of the image due to the color blur component may be corrected as follows. For example, if amounts of blur for each color component in the image become uniform by correcting the blur component as described above, the color blur component in the image is corrected.

The OTF changes according to an image capturing state, such as a zoom position state, a diaphragm diameter state, and the like. As a result, it is necessary to change the image recovery filter to be used in the image recovery process accordingly. The color blur and migration caused by the optical system can be corrected by performing the above-described process on each of the colors in the color image.

Japanese Patent Application Laid-Open No. 2010-86138 discusses a technique for correcting magnification chromatic aberration using the above-described OTF. More specifically, a magnification chromatic aberration component is detected from color shift in an edge portion of an image after the image recovery process has been performed. The edge portion of the image is then corrected, so that sharpness of the edge portion of the image is changed for each color component according to a degree of recovery.

On the other hand, there is a method for correcting the color blur in a color image by calculating a color blur area from the color image without using optical information, such as the OTF. In such a method, the blur component is removed from the area in the color image in which the color blur is noticeable, such as a saturated portion, so that the color blur is adaptively corrected. Correction is often performed in such a method by limiting a hue (e.g., a purple color) or the area (e.g., in a vicinity of a saturated pixel) to be corrected for preventing excessive correction due to erroneous determination.

Japanese Patent Application Laid-Open No. 2007-133591 discusses a technique related to the above-described correction method. More specifically, an overexposure map indicating saturated areas of an image is compared with a previously recorded chromatic aberration map calculated from a chromatic aberration model for a correction amount of the chromatic aberration. The purple portions in the pixels in the vicinity of the overexposed area are then regarded as the chromatic aberration, and correction, such as reduction of color saturation, is performed.

However, in the technique discussed in Japanese Patent Application Laid-Open No. 2010-86138, the axial chromatic aberration, the color spherical aberration, the color comatic aberration, and the like which are elements of the chromatic aberration other than the magnification chromatic aberration are not detected. It is thus difficult to accurately perform correction. Further, the chromatic aberration other than the magnification chromatic aberration can be corrected in the image recovery process. However, there may be inadequate correction depending on the degree of recovery, and the color blur may not be sufficiently removed in the saturated area in which correction is difficult. Furthermore, in the technique discussed in Japanese Patent Application Laid-Open No. 2007-133591, the area to be corrected is near the overexposed area, and the color to be corrected is limited. As a result, it is difficult to achieve sufficient correction accuracy.

SUMMARY OF THE INVENTION

According to at least one aspect of the present inventions, at least one image processing apparatus includes a first obtaining unit configured to obtain, according to an image capturing condition of when a captured image is obtained by forming an image on an image sensor via an imaging optical system, an image recovery filter for at least one of correcting and reducing at least one component of a color blur of the captured image, a second obtaining unit configured to obtain, in a case where at least one of correction and reduction of the at least one component of the color blur of the captured image using the image recovery filter has been performed on the captured image, characteristics of at least one of the at least one component and at least another component of the color blur remaining in the captured image, a first correction unit configured to perform at least one of the correction and the reduction of the at least one component of the color blur of the captured image using the image recovery filter on the captured image, and a second correction unit configured to perform, according to the characteristics of the color blur obtained by the second obtaining unit, correction for at least one of correcting and reducing at least one of the at least one component and the at least another component of the remaining color blur of the captured image on the captured image on which at least one of the correction and the reduction of the at least one component of the color blur of the captured image using the image recovery filter has been performed. According to other aspects of the present inventions, other image processing apparatuses, image processing methods and storage mediums are discussed herein.

Further features of the present inventions will become apparent from the following description of exemplary embodiments with reference to the attached drawings.

BRIEF DESCRIPTION OF THE DRAWINGS

FIG. 5 is a diagram illustrating a distribution of values (coefficients) of each of taps in the image recovery filter.

FIG. 7 is a flowchart illustrating in detail a color blur determination process.

FIG. 8 is a flowchart illustrating in detail a color blur characteristics calculation process.

FIG. 11 is a table illustrating a storage format of the characteristics of the blur of each area.

FIG. 13 is a flowchart illustrating in detail a color blur correction process.

FIG. 14 is a flowchart illustrating an image recovery process according to a second exemplary embodiment.

DESCRIPTION OF THE EMBODIMENTS

Exemplary embodiments of the present inventions will be described below with reference to the drawings.

A first exemplary embodiment will be described below.

Figure 1:
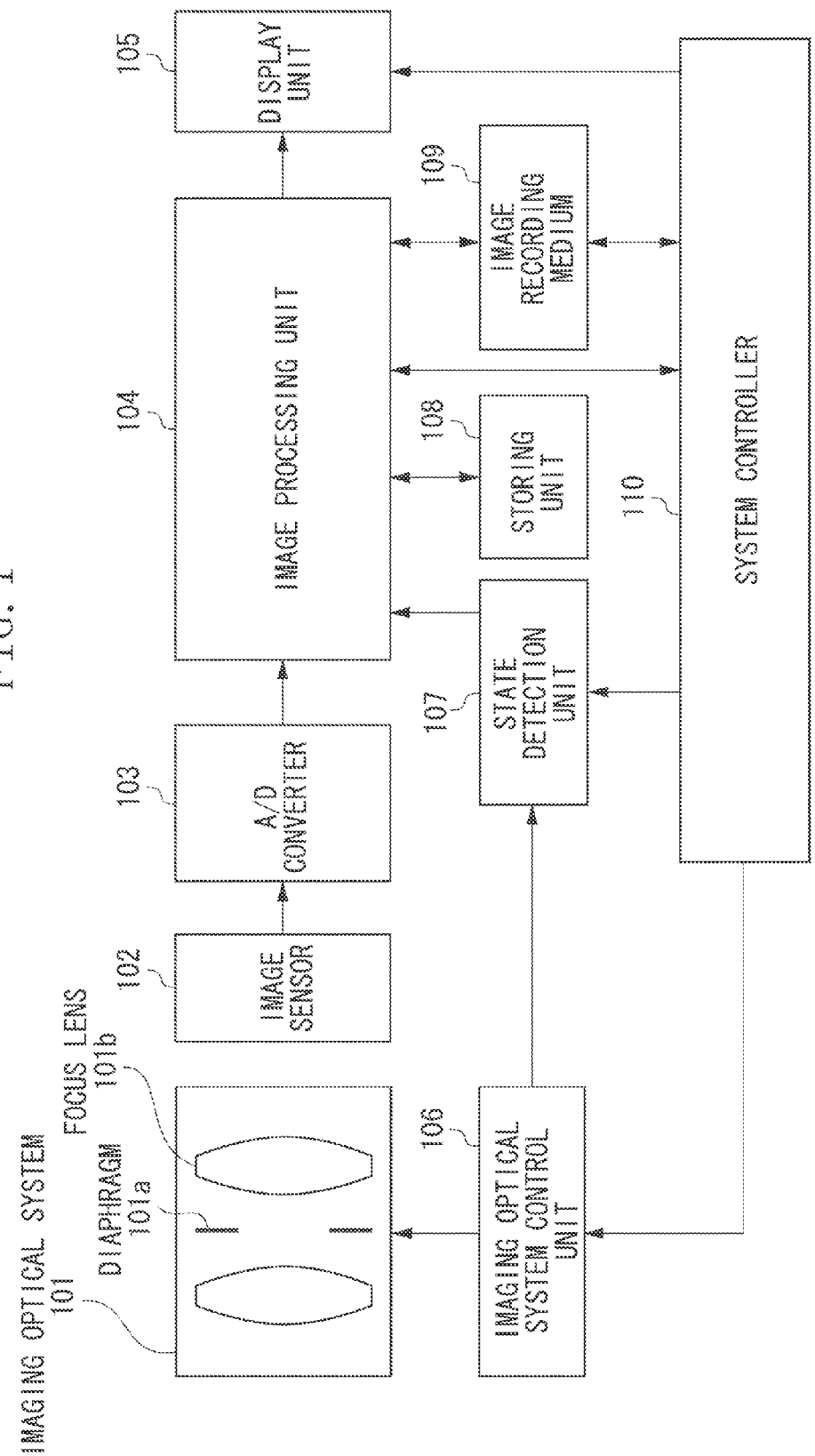
FIG. 1 is a diagram illustrating a configuration of an imaging apparatus.

FIG. 1 is a diagram illustrating an example of a basic configuration of an imaging apparatus.

An imaging optical system 101 forms an image of an object (not illustrated) on an image sensor 102. The light focused on the image sensor 102 is converted to an electric signal at the image sensor 102. An analog/digital (A/D) converter 103 then converts the electric signal to a digital signal and inputs the converted digital signal to an image processing unit 104.

In the example illustrated in FIG. 1, the imaging optical system 101 includes a diaphragm 101a and a focus lens 101b. Further, a display unit 105 displays (i.e., performs preview display of) the image signal processed by the image processing unit 104, and the like. An image recording medium 109 records the image signal processed by the image processing unit 104.

The image processing unit 104 performs a predetermined process including an image recovery process on the input signal (i.e., the captured image) as follows. The image processing unit 104 obtains information on the image capturing state of the imaging apparatus from a state detection unit 107. The state detection unit 107 is capable of directly obtaining the information on the image capturing state from a system controller 110. Further, the state detection unit 107 is capable of obtaining the information on the image capturing state for the imaging optical system 101 from an imaging optical system control unit 106, for example. The image processing unit 104 then obtains an image recovery filter according to the image capturing state and performs the image recovery process on the image signal input to the image processing unit 104 using the obtained image recovery filter.

Figure 2:
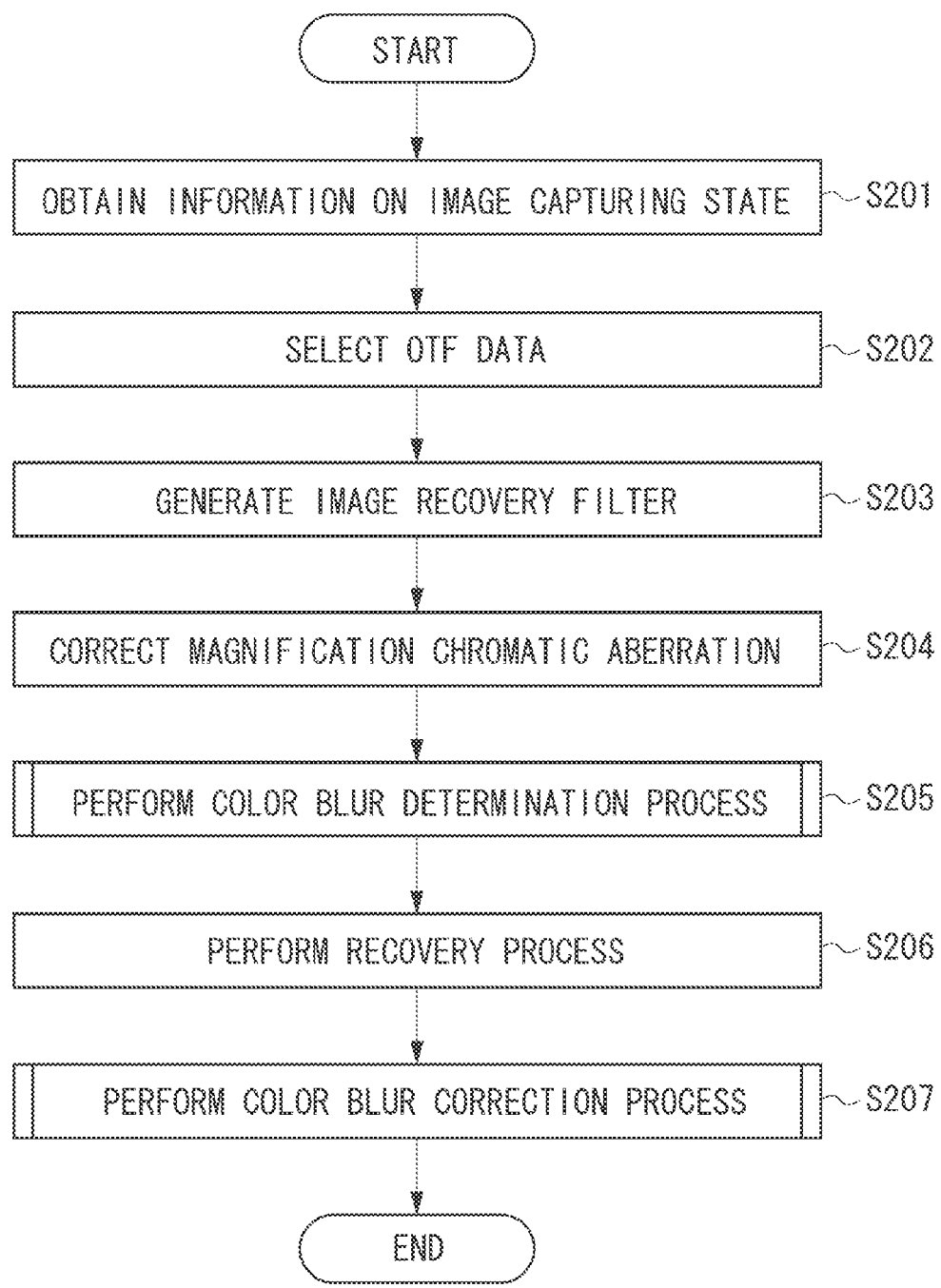
FIG. 2 is a flowchart illustrating an image recovery process according to a first exemplary embodiment.

FIG. 2 is a flowchart illustrating an example of the image recovery process performed by the image processing unit 104. In step S201, the image processing unit 104 obtains the information on the actual image capturing state from the state detection unit 107 as described above. The image capturing state includes image capturing conditions, such as a zoom position, a diaphragm diameter, and an object distance, for example. The image processing unit 104 also obtains low pass filter (LPF) characteristics, a pixel pitch, and the like of the imaging apparatus as necessary.

In step S202, the image processing unit 104 selects OTF data appropriate for the actual image capturing state from a storing unit 108. The image processing unit 104 selects among a plurality of pieces of the OTF data which is previously stored, the data closest to the image capturing state obtained in step S201 as the OTF data to be selected in step S202. Further, the image processing unit 104 may generate the OTF data corresponding to the actual image capturing state by performing interpolation using a plurality of pieces of OTF data close to the image capturing state obtained in step S201 among the plurality of pieces of OTF data previously stored.

Figure 3:
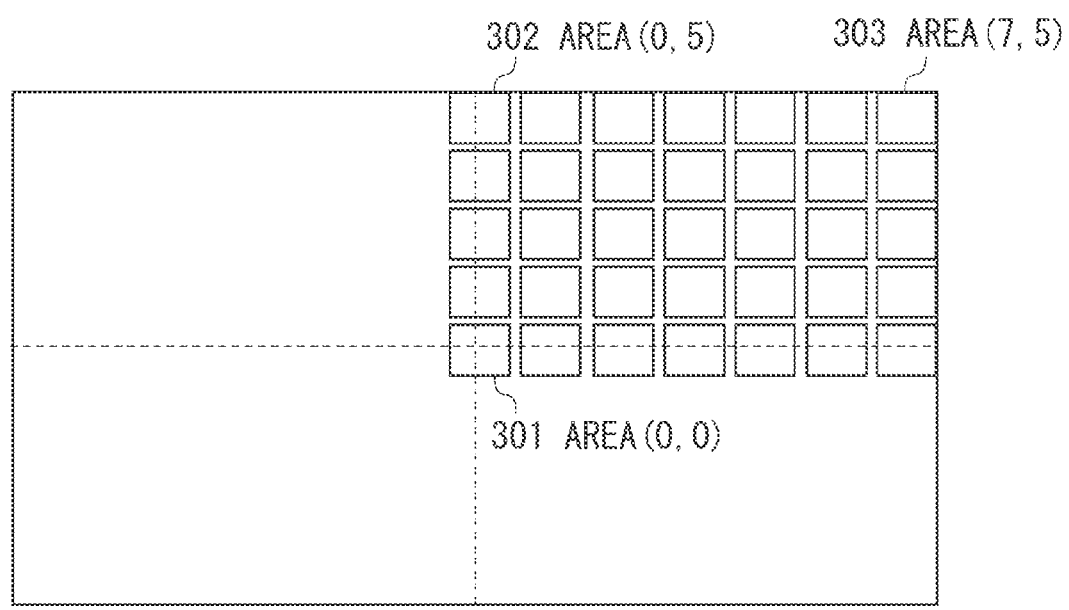
FIG. 3 is a diagram illustrating division of an area which is ¼ of an imaging plane.

Furthermore, the OTF data generally includes different characteristics with respect to an image height direction other than the image capturing state. In other words, it is necessary to calculate the OTF data for each image height. FIG. 3 is a diagram illustrating an area, which is ¼ of an imaging plane, divided into 7 in a horizontal direction and into 5 in a vertical direction with an optical center as the center. The optical characteristics are different for each area, so that it is necessary to obtain the OTF data for each area.

Since the optical characteristics of a photographic lens are often symmetrical to the center of the image, the OTF data is obtained for only the area of ¼ of the imaging plane. More specifically, as illustrated in FIG. 3, if the OTF data is stored for only the area of ¼ of the imaging plane, the OTF data of the other areas can be calculated by symmetrically expanding at the optical center. Each of the areas can be identified by indicating the coordinates, such as areas 301, 302, and 303. If there is enough recording area or symmetry of the imaging optical system 101 is low, the OTF data of the entire image plane may be stored in the storing unit 108.

As described above, according to the present exemplary embodiment, the OTF data is temporarily stored in the storing unit 108 for each of the zoom position, the diaphragm diameter, the object distance, the LPF characteristics, the pixel pitch, the area (i.e., image height), the color.

In step S203, the image processing unit 104 calculates the image recovery filter from the OTF data obtained in step S202. In general, the image recovery filter is obtained based on a result of inverse Fourier transformation on the inverse function of the OTF obtained in step S202. Further, since it is necessary to consider the effect of noise, the method for generating the Wiener filter or a related recovery filter may be selected and employed when calculating the image recovery filter. Furthermore, the OTF may include all causes of degradation of the OTF to the image input to the image processing unit 104, not only the imaging optical system 101 of the imaging lens. For example, the LPF suppresses the high frequency component to the frequency characteristics of the OTF. The shape of a pixel aperture and an aperture ratio of the image sensor 102 affect the frequency characteristics of the OTF. Spectral characteristics of a light source and various types of wavelength filters also affect the frequency characteristics of the OTF. It is desirable to generate the image recovery filter based on the OTF in broad terms including the above-described causes.

Further, the chromatic aberration occurs in the imaging optical system 101, and a degree of blur is different for each color component. The characteristics of the image recovery filter for each color component are thus slightly different based on the chromatic aberration. Furthermore, taps are not necessarily squarely arranged in the image recovery filter in terms of the number of taps in horizontal and vertical arrays, and may be arbitrarily changed if the number of taps is considered when performing convolution processing.

Figure 4:
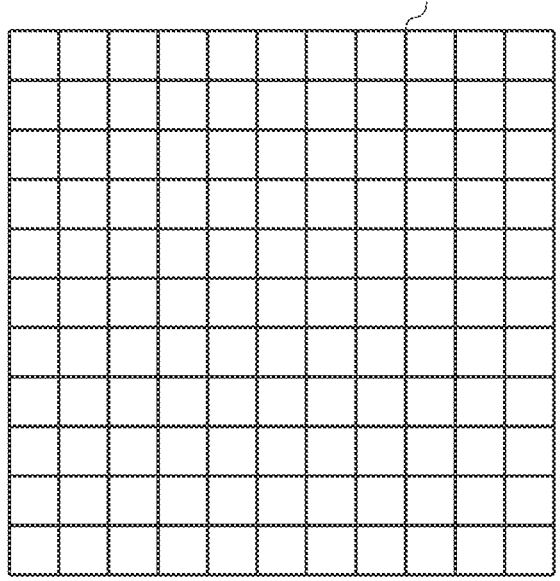
FIG. 4 is a diagram illustrating an image recovery filter.

FIG. 4 is a schematic diagram illustrating an example of an image recovery filter 401.

The number of taps in the image recovery filter may be determined according to an amount of aberration of the imaging optical system 101. Referring to FIG. 4, the image recovery filter 401 is a two-dimensional filter of 21×21 taps. Each tap in the image recovery filter 401 corresponds to one pixel in the image, and convolution processing is performed on the tap in the image recovery process. The number of taps is a finite value in the system, and if the number of taps that can be used is small due to the restriction of the system, the recovery process may not be sufficiently performed.

As illustrated in FIG. 4, the image recovery filter 401 is the two-dimensional filter divided into 100 or more taps, thereby the image recovery process can be performed even on the aberration which widely spreads from an image forming position. Such aberration includes the spherical aberration, the comatic aberration, the axial chromatic aberration, a non-axial color flare, and the like caused by the imaging optical system 101.

FIG. 5 is a graph illustrating an example of the distribution of the values (i.e., coefficients) of each tap in a cross section of the two-dimensional filter (i.e., the image recovery filter 401) illustrated in FIG. 4. Ideally, the signal values (i.e., the PSF) which have spatially spread due to the aberration in the imaging optical system 101 are returned to the pixel at the center by adding the product of the signal of each pixel input to each tap and the coefficient of the tap.

However, the ideal filter cannot be generated due to various restrictions in the process for calculating the image recovery filter. Examples of such cases will be described below with reference to FIGS. 6A and 6B.

Figure 6A:
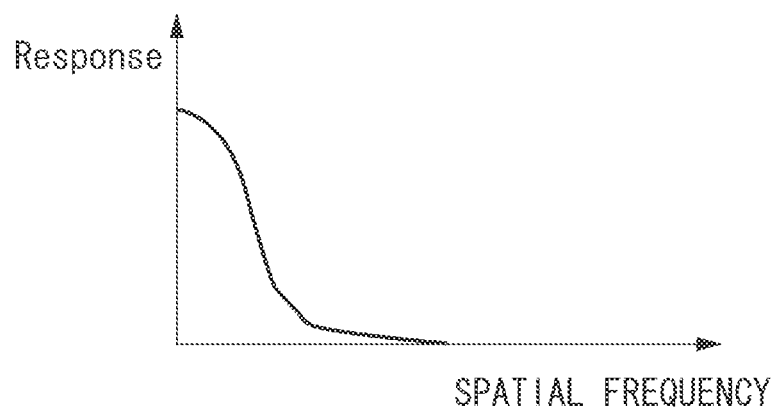
FIG. 6A is a diagram illustrating an example of spatial frequency characteristics of a lens.
Figure 6B:
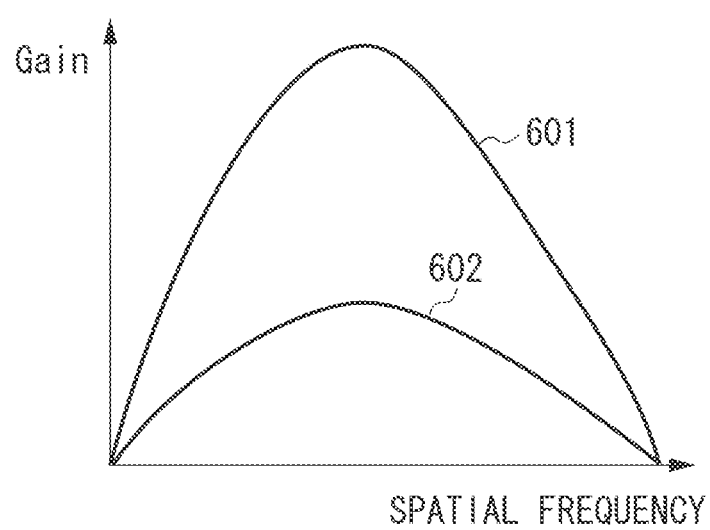
FIG. 6B is a diagram illustrating an example of a gain of the image recovery filter.

FIGS. 6A and 6B are graphs illustrating the reasons that the image recovery filter cannot be the ideal filter. FIG. 6A is the graph illustrating an example of the optical characteristics of the imaging optical system 101, and FIG. 6B is the graph illustrating an example of the characteristics of the gain as the result of using the image recovery filter.

For example, FIG. 6A illustrates the optical characteristics of considerably low frequency and in which a response of a modulation transfer function (MTF) drops to 0. In a case where a lens having such optical characteristics is used, there is hardly any high-frequency signal in the captured image. As a result, if the image recovery process is forcibly performed, only the noise is emphasized, or the edge becomes black and darkened, so that adverse effects become more noticeable as compared to the effect of the recovery. For the area having such optical characteristics, a process in which the degree of recovery is reduced is performed, or the recovery process is not performed. The above-described optical characteristics are often generated in a low cost lens or a peripheral portion of the image captured by a zoom lens of high magnification.

On the other hand, as illustrated in FIG. 6B, characteristics 601 indicate the gain in an ideal recovery when consideration is given not to emphasize the high-frequency noise. However, there may be a case where the image recovery process cannot be sufficiently performed due to the characteristics of the imaging apparatus, so that correction can only be performed as illustrated by characteristics 602 in which the maximum gain is weakened.

The image recovery process cannot be sufficiently performed in the areas corresponding to the characteristics illustrated in FIGS. 6A and 6B, and a large amount of inadequate correction occurs. Since an amount of inadequate correction occurs for each color, the chromatic aberration also becomes inadequately corrected.

To solve such a problem, according to the present exemplary embodiment, the gain (i.e. the coefficient) of the image recovery filter is not set as the inverse characteristics of the OTF. The gain is instead set smaller than the inverse characteristic of the OTF according to the characteristics of the imaging apparatus. The characteristics of the imaging apparatus are at least one of the response of the OTF of the imaging optical system 101, noise resistance of the image sensor 102, a dynamic range of the image sensor 102, and the number of taps in the image recovery filter. According to the present exemplary embodiment, the image processing unit 104 calculates the image recovery filter, so that an example of a first obtaining unit is realized.

The process of step S204 in the flowchart illustrated in FIG. 2 will be described below. According to the present exemplary embodiment, the image recovery filter is a filter in which a parallel shift component of the magnification chromatic aberration has been removed. In other words, the image recovery filter according to the present exemplary embodiment corrects non-symmetry and spreading of the aberration and sharpens the image. However, the image recovery filter does not correct the parallel shift component of the magnification chromatic aberration. Such a filter is generated based on the OTF in which a linear component corresponding to the magnification chromatic aberration has been removed from a phase transfer function (PTF) which is a phase of the OTF.

Such a filter is used for the following reason. The parallel shift component of the magnification chromatic aberration is corrected using a different method, such as pixel shift, so that the number of taps necessary in the image recovery filter can be reduced. In step S204, the image processing unit 104 thus corrects the magnification chromatic aberration using a conventional method.

In step S205, the image processing unit 104 performs color blur determination, i.e., determines the area in the image and the degree of the color blur remaining after the image recovery process has been performed. The image recovery filter generated in step S203 is often a filter which inadequately performs recovery as described above with reference to FIGS. 6A and 6B. As a result, in principle, the characteristics of the remaining color blur can be estimated by comparing the original OTF and the image recovery filter generated in step S203. Items to be estimated are at least any one of a color, an amount (i.e., a width), and a direction of the blur.

An example of the color blur determination process performed in step S205 will be described below with reference to the flowchart illustrated in FIG. 7. It is necessary to perform the color blur determination process for each area illustrated in FIG. 3.

In step S701, the image processing unit 104 reads the OTF data of each area stored in the storing unit 108 in step S202 corresponding to the image capturing states. The data of the OTF will be indicated as H (u, v).

In step S702, the image processing unit 104 performs Fourier transformation on the image recovery filter calculated in step S203. The image recovery filter on which Fourier transformation has been performed is R (u, v). The product of H (u, v) and R (u, v) is T (u, v). T (u, v) corresponds to the OTF of the image after recovery has been performed using the image recovery filter calculated in step S203.

In step S703, the image processing unit 104 performs inverse Fourier transformation on T (u, v) and calculates the corrected PSF. The corrected PSF is t (x, y).

In step S704, the image processing unit 104 calculates the blurred color, i.e., an example of the characteristics of the blur, for each area from the corrected PSF.

An example of the color blur characteristics calculation process for determining the blurred color in each area will be described in detail below with reference to the flowchart illustrated in FIG. 8.

Figure 9A:
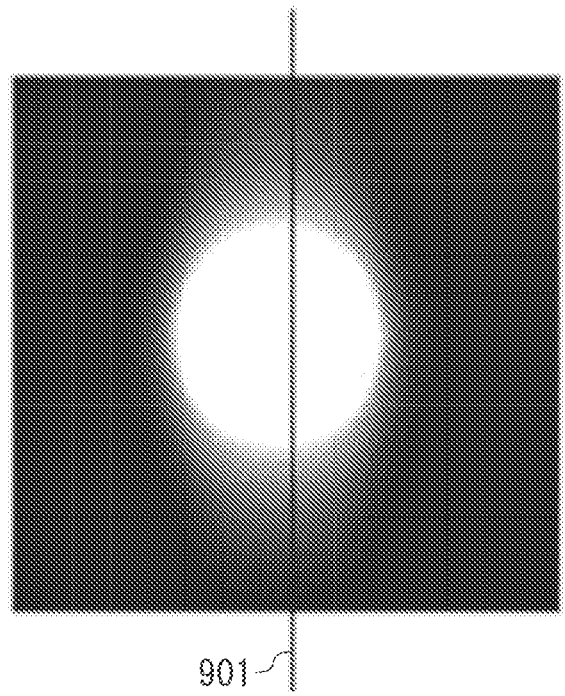
FIG. 9A is a diagram illustrating an example of a PSF.
Figure 9B:
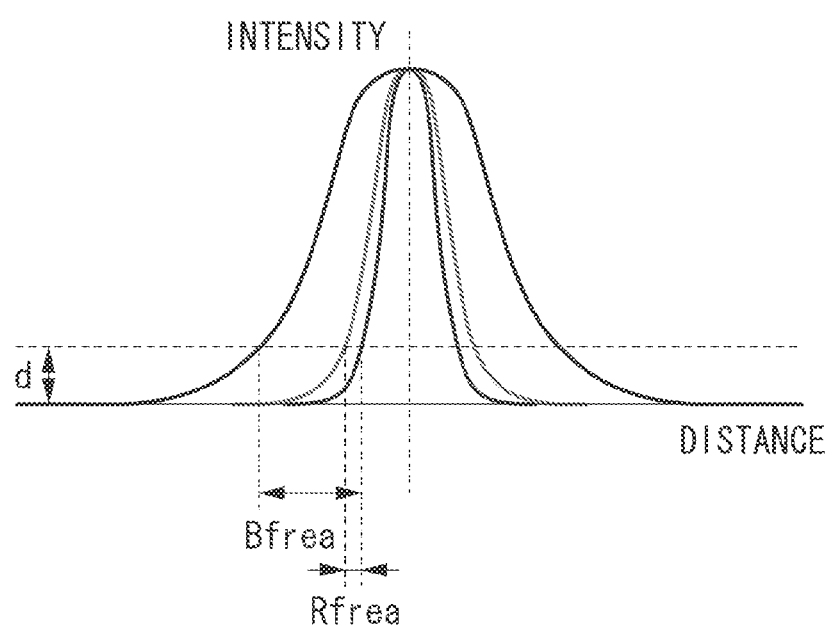
FIG. 9B is a diagram illustrating an example of a PSF in a meridional direction.

More specifically, an example of the case where the corrected PSF in the area 302 illustrated in FIG. 3 is represented as illustrated in FIGS. 9A and 9B (i.e., a blue blur remains in the meridional direction) will be described below.

In step S801, the image processing unit 104 obtains information on the cross section to be calculated from the PSF calculated in step S703. Normally, the image processing unit 104 obtains the information on the cross section of at least one of the sagittal direction and the meridional direction. FIG. 9B is the graph illustrating the information (i.e., the intensity distribution) of the cross section of the PSF in the meridional direction illustrated in FIG. 9A. The information illustrated in FIG. 9B is obtained by acquiring a line profile in the direction of a line 901.

In step S802, the image processing unit 104 obtains a blur amount Xfrea to green (G) from the cross section obtained in step S801. Referring to FIG. 9B, the difference between a position of G and a position of blue (B) having intensity d determined by considering the noise is a blue blur amount Bfrea to G. Similarly, the difference between the position of G and a position of red (R) having intensity d is a red blur amount Rfrea to G. From the example illustrated in FIG. 9B, the PSF illustrated in FIG. 9A has the characteristics of the blue blur in the meridional direction.

In step S803, the image processing unit 104 compares a predetermined threshold value Thfrea with the blur amount Xfrea to G (i.e., the blue blur amount Bfrea to G or the red blur amount Rfrea to G). The threshold value Thfrea is set as a value (i.e., a positive value) of the blur amount to be corrected in a case where such a blur amount or greater occurs as the blur amount.

If the blur amount Xfrea to G is less than a value −Thfrea obtained by multiplying −1 to the threshold value Thfrea (Xfrea<−Thfrea), the process proceeds to step S804. In step S804, the image processing unit 104 sets a flag Xflag to 2 (i.e., Xflag=2).

If the blur amount Xfrea to G is greater than the threshold value Thfrea (Xfrea>Thfrea), the process proceeds to step S805. In step S805, the image processing unit 104 sets the flag Xflag to 1 (i.e., Xflag=1).

If the blur amount Xfrea to G is greater than or equal to the value −Thfrea obtained by multiplying −1 to the threshold value Thfrea and less than or equal to the threshold value Thfrea (−Thfrea≤Xfrea≤Thfrea), the process proceeds to step S806. In step S806, the image processing unit 104 sets the flag Xflag to 0 (i.e., Xflag=0).

In the example illustrated in FIG. 9, a flag Bflag is set to 1 (Bflag=1) for the blue blur amount Bfrea to G. On the other hand, if it is assumed that the red blur amount Rfrea to G is smaller than the threshold value Thfrea, a flag Rflag is set to 0 (Rflag=0) for the red blur amount Rfrea to G.

Figure 10:
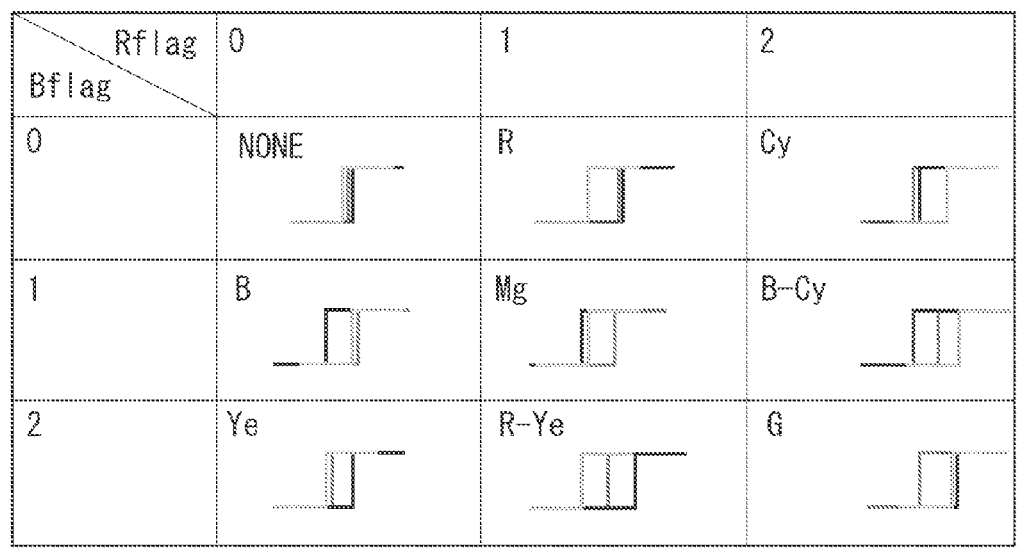
FIG. 10 is a table illustrating a blurred color determination.

In step S807, the image processing unit 104 reads the value of the flag Xflag (i.e., the Bflag and the Rflag) set for the blue blur amount Bfrea to G and the red blur amount Rfrea to G. The image processing unit 104 then refers to a blurred color determination table illustrated in FIG. 10 and estimates the remaining color from each of the read values. The example illustrated in FIGS. 9A and 9B indicates that the blurred color is blue, the blurred amount is Bfrea (i.e., there is no red blurred amount), and the direction of the blur is in the meridional direction with reference to the blurred color determination table illustrated in FIG. 10. It is desirable for the blurred amount to be converted from the pixel pitch of the image sensor 102 and to be in unit of pixels.

The image processing unit 104 performs the above-described calculation for all of the areas illustrated in FIG. 3. According to the present exemplary embodiment, the image processing unit 104 calculates the characteristics (i.e., the color, the amount (the width), and the direction) of the color blur in each area as described above and realizes an example of a second obtaining unit.

In step S705 illustrated in FIG. 7, the image processing unit 104 stores the calculation results of each area in the storing unit 108. FIG. 11 is a schematic diagram illustrating an example of the storage format of the characteristics of the blur (i.e., the blurred color, the direction of the blur, and the blur amount) of each area. Referring to FIG. 11, the blurred color, the direction of the blur, and the blur amount are stored in association with each other for each area in the storing unit 108. The color, amount, and direction of the color blur remaining in each area in the image after the recovery as a result of applying the generated image recovery filter can thus be estimated The process illustrated in FIG. 7 (i.e., step S205 illustrated in FIG. 2) thus ends, and the process proceeds to step S206 of the flowchart illustrated in FIG. 2.

In step S206, the image processing unit 104 uses the image recovery filter calculated in step S203 and performs convolution processing (i.e., recovery processing) on the captured image in the image recovery process. As a result, the blur component in the image due to the aberration which occurs in the image optical system 101 can be removed or reduced. According to the present exemplary embodiment, the image processing unit 104 performs the recovery process using the above-described image recovery filter and realizes an example of the first correction unit. As described above, the image recovery filters appropriate for each of the color components R, G, and B are used, so that the chromatic aberration is also corrected. However, in a case where the characteristics are the one as illustrated in FIGS. 6A and 6B, the chromatic aberration remains to a certain extent. Further, in a case where the captured image is saturated in the image recovery process, sufficient recovery cannot be achieved.

Figure 12A:
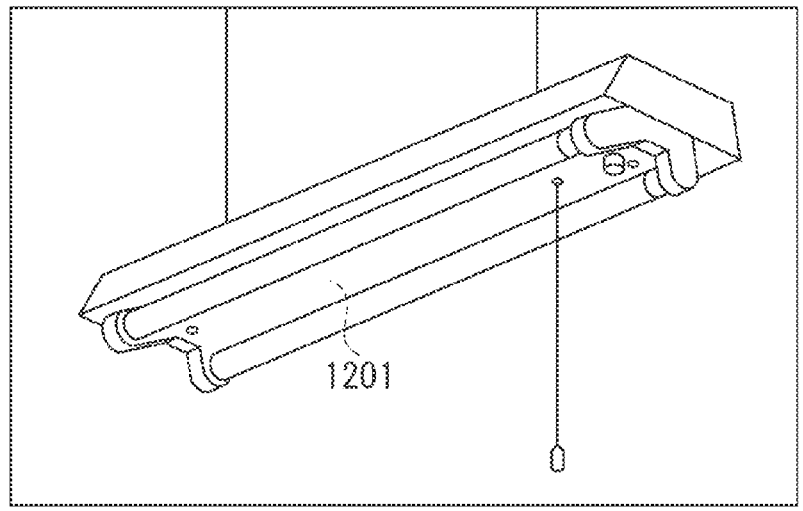
FIG. 12A is a diagram illustrating an example of an image including a saturated area.
Figure 12B:
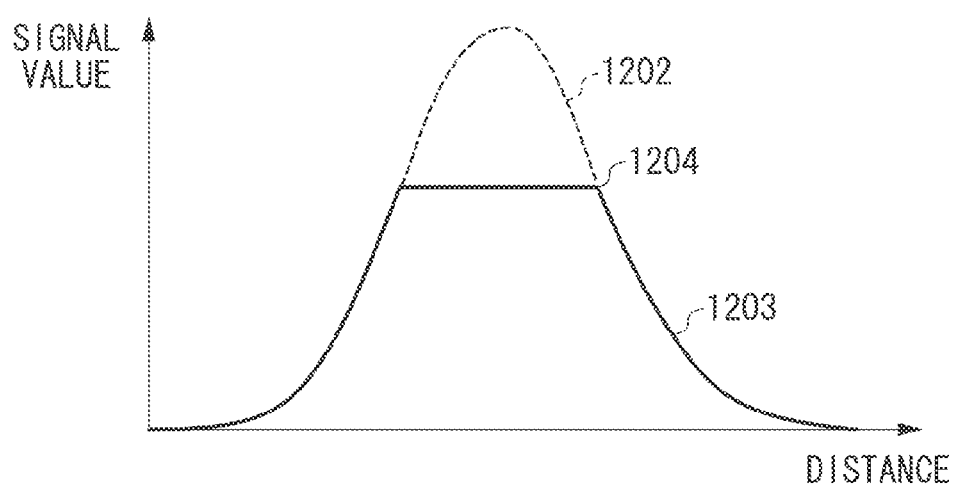
FIG. 12B is a graph illustrating a line profile obtained to a light emission area.

An example illustrated in FIGS. 12A and 12B is for explaining the reason that the image recovery cannot be sufficiently performed. FIG. 12A is a diagram illustrating an example of an image including the saturated area. If a captured image is of a fluorescent lamp captured using a normal imaging apparatus as illustrated in FIG. 12A, it is highly likely that luminance exceeding a saturation signal level is input to a light emitting area 1201 and the area is saturated.

FIG. 12B is a graph illustrating a line profile obtained to the light emitting area 1201. Referring to FIG. 12B, if there is sufficient dynamic range of the imaging apparatus, a luminance signal of the light emitting area 1201 can be expressed as a signal 1202 indicated by a broken line. On the other hand, if the dynamic range is insufficient and the image sensor has become saturated, the signal of the light emitting area 1201 is clipped at a saturation level of the image sensor as expressed as a signal 1203 indicated by a solid line. In other words, an edge 1204 including a large amount of the high frequency component which does not exist in the actual signal 1202 is recorded in the image.

In the image recovery process, the filter is generated without assuming such an object having the edge including the high frequency component which does not occur in reality. As a result, if the image recovery process is performed, the adverse effects, such as ringing and black darkening of the edge occur. To prevent such a phenomenon from occurring, the process for not performing recovery or reducing the recovery rate in the image saturated portion is added in the normal image recovery process, so that the above-described adverse effects are suppressed. The recovery is thus not sufficiently performed in the vicinity of the image saturated portion, and the color blur also remains. In particular, the color blur is noticeable in the vicinity of the image saturated portion, and an image having sufficient image quality cannot be obtained as the recovered image.

To solve such a problem, according to the present exemplary embodiment, in the process of step S207, the image processing unit 104 detects the color blur from the image based on the result of the color blur determination process performed in step S205. The image processing unit 104 then performs the color blur correction process in which the blurred color is adaptively deleted.

An example of the color blur correction process will be described in detail below with reference to the flowchart illustrated in FIG. 13. According to the present exemplary embodiment, a case where a color blur removal process is performed in which the color blur of an R plane and a B plane among color planes (i.e., R, G, and B planes) is to be removed using the G plane as a reference plane will be described as an example. The color blur correction process is performed as follows. The R or B blur amount to the blur amount of the G plane in the edge portion of the image is determined. If each of the R and B blur amounts is larger than the blur amount of the G plane, the blur is removed by causing the R and B blur amount to be the same as the blur amount of the G plane.

In step S1301, the image processing unit 104 detects the edge of the input image. Since the blur appears in the edge portion of the image, the edge of the input image is detected.

In step S1302, the image processing unit 104 detects the color blur in the image of the edge portion detected in step S1301. There are various methods for detecting the color blur. For example, in a general method, a gradient of the edge of G is compared with the gradient of R or B, and the blur amount of R or B to G is determined. The gradient is the difference from the adjacent pixel. The detected blur information includes the direction of the edge, the color of the blur, and the color blur amount. Further, there is a method for detecting the color blur by calculating the hue of the peripheral portion of the edge. The detection method of the color blur performed in step S1302 is thus not particularly limited.

In step S1303, the image processing unit 104 determines whether the color blur detected in step S1302 occurs by an optical attribute (i.e., the chromatic aberration). The color blur detected in step S1302 often includes the color blur of an object color in a peripheral portion of a colored light source other than the color blur due to the optical attribute. Therefore, in step S1303, the information on a corresponding area in the list (refer to FIG. 11) stored in the storing unit 108 is compared with the information on the color blur detected in step S1302 to identify whether the color blur in the pixel is due to the optical attribute or the object.

If the color of the color blur detected in step S1302 is close to the color detected in step S205 (in view of a RGB ratio, the hue, and the like), it is highly likely that the blur detected in step S1302 is due to the optical attribute (YES in step S1303). On the other hand, if the color of the color blur detected in step S1302 is not close to the color detected in step S205, it is highly likely that the blur detected in step S1302 is the color blur of the object color (NO in step S1303). If the color blur detected in step S1302 is the color blur of the object color based on the above-described determination basis, the process of the flowchart illustrated in FIG. 13 ends.

If the color blur detected in step S1302 is the color blur due to the optical attribute, the process proceeds to step S1304. In step S1304, the image processing unit 104 determines whether there is the saturated portion in the vicinity of the edge of the input image. If there is the saturated portion in the vicinity of the edge of the input image (YES in step S1304), the process proceeds to step S1305. In step S1305, the image processing unit 104 increases removal strength of the color blur for the following reason. In the saturated portion of the image, it is likely that the color blur strongly appears, so that reducing effect of the chromatic aberration cannot be expected by performing recovery as illustrated in FIG. 7. The process then proceeds to step S1306.

If there is no saturated portion in the vicinity of the edge of the input image (NO in step S1304), the process proceeds to step S1306 by skipping the process of step S1305. In such a case, the removal strength of the color blur becomes a reference value (i.e., a value smaller than the value set in step S1305).

In step S1306, the image processing unit 104 performs the color blur removal process. The color blur removal process is the method for removing the color blur by combining one or both of the gradients of the R and B planes with the gradient of the G plane, or reducing the color saturation of the edge. However, the method of the color blur removal process in step S1306 is not limited. According to the present exemplary embodiment, the image processing unit 104 performs the color blur correction process as described above and realizes an example of the second correction unit. The process of the flowchart illustrated in FIG. 13 (i.e., FIG. 2) thus ends.

As described above, according to the present exemplary embodiment, the OTF is selected for each area in the imaging plane according to at least the image capturing state. The image recovery filter for correcting the chromatic aberration is then generated from the selected OTF, and the chromatic aberration in the captured image is corrected using the image recovery filter. Further, the characteristics of the color blur of each area in the case where the image recovery filter is used are calculated. The color blur of the edge of the image in which the chromatic aberration has been corrected using the image recovery filter is detected for each area in the captured image based on the result of calculation of the characteristics of the color blur, and the color blur is removed. The inadequate correction amount of the color blur in the image recovery process is thus accurately calculated for each area in the image, and the process is adaptively performed on the calculated inadequate correction amount. As a result, a highly-accurate recovery image can be generated. The chromatic aberration remaining due to the correction process in the image recovery process can be appropriately processed in the final image without erroneously erasing the object color. An image of higher quality with little color blur can thus be output.

The above-described method according to the present exemplary embodiment is not limited to be used in the imaging apparatus, and may be used as an image processing algorithm running on a personal computer (PC).

A second exemplary embodiment will be described below. According to the present exemplary embodiment, the case where the chromatic aberration correction process is performed in an imaging apparatus in which an optical system and an imaging system are integrated, and which performs imaging using a predetermined optical system, will be described below. The first exemplary embodiment can be flexibly applied to the cases where the imaging optical system is changed by an interchangeable lens, or the optical LPF is detachable, and a special case where the image sensor is exchangeable to the imaging apparatus. However, since Fourier transformation and inverse Fourier transformation are performed in step S203 and step S205 in the flowchart illustrated in FIG. 2, a processing time becomes long.

On the other hand, the optical system is limited in the above-described integrated imaging apparatus, so that the process which becomes a load can be previously calculated and stored, and the processing time can be greatly reduced. According to the present exemplary embodiment, the imaging optical system 101 and the image sensor 102 illustrated in FIG. 1 are integrated in the imaging apparatus and cannot be changed.

An example of the image recovery process performed by the image processing unit 104 which is appropriate for such an imaging apparatus will be described below with reference to the flowchart illustrated in FIG. 14.

In step S1401, the image processing unit 104 obtains information on the actual image capturing state from the state detection unit 107 similarly as in the first exemplary embodiment. According to the present exemplary embodiment, the characteristics of the imaging apparatus, such as the pixel pitch and the LPF characteristics which do not change are not necessary to obtain.

In step S1402, the image processing unit 104 selects the corresponding image recovery filter according to the image capturing state obtained from the state detection unit 107. According to the first exemplary embodiment, the image recovery filter is calculated from the OTF (in step S202 and step S203). In contrast, according to the present exemplary embodiment, the calculation is previously performed, and the result is stored in the storing unit 108. As a result, in step S1402, it is only necessary for the image processing unit 104 to select one image recovery filter corresponding to the image capturing state from the previously stored plurality of image recovery filters.

Further, the color blur determination process described with reference to FIGS. 9A and 9B is previously performed with respect to each image recovery filter. The result of the color blur determination process is stored in the storing unit 108 in association with the image recovery filter corresponding to the result. In step S1403, the image processing unit 104 selects the result of the color blur determination result (i.e., the color blur information) associated with the image recovery filter selected in step S1402. The processing time can thus be greatly reduced. According to the present exemplary embodiment, the image processing unit 104 selects the image recovery filter and the result of the color blur determination result associated with the image recovery filter as described above and realizes an example of the first obtaining unit and the second obtaining unit.

In step S1404, the image processing unit 104 corrects the magnification chromatic aberration using a similar method as the first exemplary embodiment. In step S1405, the image processing unit 104 performs the recovery process using the image recovery filter. The image saturated portion may be treated similarly as the first exemplary embodiment. According to the present exemplary embodiment, the image processing unit 104 performs the recovery process using the image recovery filter as described above and realizes an example of the first correction unit.

In step S1406, the image processing unit 104 performs the color blur correction process based on the result of the color blur determination process (i.e., the blur information) read in step S1403. The color blur correction process is similarly performed as the first exemplary embodiment (i.e., step S207). According to the present exemplary embodiment, the image processing unit 104 performs the color blur correction process as described above and realizes an example of the second correction unit.

As described above, the processes which require time are previously performed for the imaging apparatus in which the optical system and the imaging system are integrated, so that the processing time can be reduced.

The above-described exemplary embodiments are only examples of implementations for performing the present inventions, and a technical scope of the present inventions is not to be narrowly interpreted thereby. That is, the present inventions may be realized in various forms without departing from a technical concept or main features thereof.

Embodiment(s) of the present inventions can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present inventions have been described with reference to exemplary embodiments, it is to be understood that the inventions are not limited to the disclosed exemplary embodiments. The scope of the following claims is to be accorded the broadest interpretation so as to encompass all such modifications and equivalent structures and functions.

This application claims the benefit of Japanese Patent Application No. 2014-021609, filed Feb. 6, 2014, which is hereby incorporated by reference herein in its entirety.

What is claimed is:

1. An image processing apparatus comprising:
a first obtaining unit configured to obtain, according to an image capturing condition of when a captured image is obtained by forming an image on an image sensor via an imaging optical system, an image recovery filter for at least one of correcting and reducing at least one component of a color blur of the captured image;
a second obtaining unit configured to obtain, in a case where at least one of correction and reduction of the at least one component of the color blur of the captured image using the image recovery filter has been performed on the captured image, characteristics of at least one of the at least one component and at least another component of the color blur remaining in the captured image, wherein at least one of the characteristics of at least one of the at least one component and the at least another component of the color blur remaining in the captured image is obtained by comparing a predetermined color blur threshold value with a blur amount of at least one of the at least one component and the at least another component of the color blur remaining in the captured image;
a first correction unit configured to perform at least one of the correction and the reduction of the at least one component of the color blur of the captured image using the image recovery filter on the captured image; and
a second correction unit configured to perform, according to the characteristics of the color blur obtained by the second obtaining unit, correction for at least one of correcting and reducing at least one of the at least one component and the at least another component of the remaining color blur of the captured image on the captured image on which at least one of the correction and the reduction of the at least one component of the color blur of the captured image using the image recovery filter has been performed.

2. The image processing unit according to claim 1, wherein the characteristics of the color blur include at least one of a color, a width or the blur amount, and a direction of a color blur.

3. The image processing apparatus according to claim 2, wherein the second obtaining unit obtains the characteristics of the color blur for each area of a size corresponding to a tap in the image recovery filter.

4. The image processing apparatus according to claim 1, wherein the second obtaining unit corrects, based on an optical transmission function of the imaging optical system and the image recovery filter, a point spread function of the imaging optical system, and calculates, based on the corrected point spread function, characteristics of the color blur remaining in the captured image.

5. The image processing apparatus according to claim 1, wherein the second obtaining unit selects, from a plurality of characteristics of a color blur previously stored for each image capturing condition, the characteristics of the color blur corresponding to the image capturing condition of when the captured image has been obtained.

6. The image processing apparatus according to claim 1, wherein a gain set to the image recovery filter is set to a smaller value than a gain based on inverse characteristics of an optical transmission function of the imaging optical system.

7. The image processing apparatus according to claim 2, wherein a gain set to the image recovery filter is set based on characteristics of an imaging apparatus, the characteristics of the imaging apparatus including at least one of an optical transmission function of the imaging optical system, noise resistance of the image sensor, a dynamic range of the image sensor, and a number of taps in the image recovery filter.

8. The image processing apparatus according to claim 1, wherein the first obtaining unit obtains an optical transmission function of the imaging optical system according to the image capturing condition and generates the image recovery filter based on the obtained optical transmission function.

9. The image processing apparatus according to claim 1, wherein the first obtaining unit selects, from a plurality of image recovery filters previously stored for each image capturing condition, the image recovery filter corresponding to the image capturing condition of when the captured image has been obtained.

10. The image processing apparatus according to claim 1, wherein the image recovery filter is generated based on an optical transmission function in which a linear component corresponding to magnification chromatic aberration is removed from frequency characteristics of a phase of the optical transmission function of the imaging optical system.

11. The image processing apparatus according to claim 1, wherein the second obtaining unit refers to a blurred color determination table and estimates the remaining color of the image.

12. The image processing apparatus according to claim 1, wherein the second obtaining unit: (i) obtains threshold value comparison results for at least two color components of the color blur; and (ii) obtains information from the blurred color determination table using the results for the at least two color components.

13. The image processing apparatus according to claim 3, wherein the characteristics of the color blur for each of the areas includes color, blur direction and a blurred amount, and the second obtaining unit stores the color, the blur direction and the blurred amount of each of the areas.

14. The image processing apparatus according to claim 1, wherein the reduction or the correction is not performed for a saturated portion of the captured image to avoid or suppress the adverse effects of ringing and black darkening of an edge in the captured image.

15. The image processing apparatus according to claim 14, wherein a reduction or a correction is performed for the saturated portion of the captured image by adaptively deleting the color blur.

16. The image processing apparatus according to claim 1, wherein the image recovery filter is a filter in which a parallel shift component of a magnification chromatic aberration has been removed such that the image recovery filter corrects non-symmetry and spreading of the magnification chromatic aberration, and sharpens the captured image.

17. The image processing apparatus according to claim 16, wherein the parallel shift component of the magnification chromatic aberration is corrected using a pixel shift so that a number of taps in the image recovery filter is reduced compared to a number of taps that would be needed in an image recovery filter including the parallel shift component of the magnification chromatic aberration.

18. An image processing method comprising:
obtaining, according to an image capturing condition of when a captured image is obtained by forming an image on an image sensor via an imaging optical system, an image recovery filter for at least one of correcting and reducing at least one component of a color blur of the captured image;
obtaining, in a case where at least one of correction and reduction of the at least one component of the color blur of the captured image using the image recovery filter has been performed on the captured image, characteristics of at least one of the at least one component and at least another component of the color blur remaining in the captured image, wherein at least one of the characteristics of at least one of the at least one component and the at least another component of the color blur remaining in the captured image is obtained by comparing a predetermined color blur threshold value with a blur amount of at least one of the at least one component and the at least another component of the color blur remaining in the captured image;
performing at least one of the correction and the reduction of the at least one component of the color blur of the captured image using the image recovery filter on the captured image; and
performing, according to the obtained characteristics of the color blur, correction for at least one of correcting and reducing at least one of the at least one component and the at least another component of the remaining color blur of the captured image on the captured image on which at least one of the correction and the reduction of the at least one component of the color blur of the captured image using the image recovery filter has been performed.

19. The image processing method according to claim 18, wherein the characteristics of the color blur include at least one of a color, a width or the blur amount, and a direction of a color blur.

20. The image processing method according to claim 19, wherein the characteristics of the color blur are obtained for each area of a size corresponding to a tap in the image recovery filter.

21. The image processing method according to claim 18, wherein the characteristics of the color blur are calculated based on a point spread function of the imaging optical system which has been corrected according to an optical transmission function of the imaging optical system and the image recovery filter.

22. The image processing method according to claim 18, wherein the characteristics of the color blur are selected corresponding to the image capturing condition of when the captured image has been obtained from a plurality of characteristics of a color blur previously stored for each image capturing condition.

23. The image processing method according to claim 18, wherein a gain set to the image recovery filter is set to a smaller value than a gain based on inverse characteristics of an optical transmission function of the imaging optical system.

24. The image processing method according to claim 19, wherein a gain set to the image recovery filter is set based on characteristics of an imaging apparatus, the characteristics of the imaging apparatus including at least one of an optical transmission function of the imaging optical system, noise resistance of the image sensor, a dynamic range of the image sensor, and a number of taps in the image recovery filter.

25. The image processing method according to claim 18, wherein the image recovery filter is generated based on an optical transmission function of the imaging optical system obtained according to the image capturing condition.

26. The image processing method according to claim 18, wherein the image recovery filter is selected corresponding to the image capturing condition of when the captured image has been obtained from a plurality of image recovery filters previously stored for each image capturing condition.

27. The image processing method according to claim 18, wherein the image recovery filter is generated based on an optical transmission function in which a linear component corresponding to magnification chromatic aberration is removed from frequency characteristics of a phase of an optical transmission function of the imaging optical system.

28. A non-transitory computer-readable storage medium storing a program that causes a computer included in an image processing system to perform each process in the image processing method according to claim 18.

* * * * *